US011608879B2

United States Patent
Lee et al.

(10) Patent No.: US 11,608,879 B2
(45) Date of Patent: Mar. 21, 2023

(54) DISCONNECTOR APPARATUS

(71) Applicant: HYUNDAI TRANSYS INC., Seosan-si (KR)

(72) Inventors: Man Bok Lee, Hwaseong-si (KR); Jong Bae Ahn, Suwon-si (KR); Sang Heon Lee, Ansan-si (KR); Bong Joo Shin, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 17/548,536

(22) Filed: Dec. 12, 2021

(65) Prior Publication Data

US 2022/0389998 A1  Dec. 8, 2022

(30) Foreign Application Priority Data

Jun. 8, 2021  (KR) .................. 10-2021-0074327

(51) Int. Cl.
*F16H 48/08* (2006.01)
*F16H 48/24* (2006.01)
*F16H 48/34* (2012.01)

(52) U.S. Cl.
CPC ............ *F16H 48/08* (2013.01); *F16H 48/24* (2013.01); *F16H 2048/346* (2013.01)

(58) Field of Classification Search
CPC .... F16H 48/24; F16H 2048/346; F16H 48/34; F16D 27/10–118; F16D 27/14
See application file for complete search history.

(56) References Cited

U.S. PATENT DOCUMENTS

| 5,911,643 | A  | * | 6/1999  | Godlew ................. F16H 48/08 |
|           |    |   |         | 475/150                            |
| 9,989,140 | B2 | * | 6/2018  | Onitake ................. F16H 48/24 |
| 2021/0356027 | A1 | * | 11/2021 | Rajendran ............... F16H 48/24 |
| 2022/0163071 | A1 | * | 5/2022  | Yu ........................... F16D 27/14 |

FOREIGN PATENT DOCUMENTS

| CN | 206904181 U | * | 1/2018 |
| CN | 207278827 U | * | 4/2018 |
| CN | 111765232 A | * | 10/2020 |
| DE | 102009056088 A1 | | 9/2011 |
| JP | H11201262 A | | 7/1999 |

(Continued)

*Primary Examiner* — Huan Le
*Assistant Examiner* — James J Taylor, II
(74) *Attorney, Agent, or Firm* — Novick, Kim & Lee PLLC; Jae Youn Kim

(57) ABSTRACT

Proposed is a disconnector apparatus including: a support ring provided in a differential casing and configured to support a pinion gear mounted therein; a clutch ring configured to be coupled to or decoupled from the support ring in the differential casing; an actuator including an armature provided at an outer side of the differential casing opposite to the clutch ring, the actuator being configured to couple the clutch ring and the support ring by pulling, with an electromagnetic force, the armature connected to the clutch ring by an application rod; and an elastic member coupled to a portion of the application rod in the differential casing and having one end in contact with the differential casing and the other end in contact with the clutch ring to elastically support the clutch ring.

11 Claims, 5 Drawing Sheets

(56) References Cited

FOREIGN PATENT DOCUMENTS

| | | |
|---|---|---|
| JP | 2011033117 A | 2/2011 |
| JP | 2013011288 A | 1/2013 |
| JP | 002018009600 A | 1/2018 |
| JP | 6343091 B2 | 6/2018 |
| KR | 1020170123869 A | 11/2017 |
| WO | 002020144090 A1 | 7/2020 |

* cited by examiner

PRIOR ART

DISCONNECTOR APPARATUS

CROSS-REFERENCE TO RELATED APPLICATIONS

This application claims priority to and the benefit of Korean Patent Application No. 10-2021-0074327 filed in the Korean Intellectual Property Office on Jun. 8, 2021, the entire contents of which are incorporated herein by reference.

TECHNICAL FIELD

The present invention relates to a disconnector apparatus capable of allowing a vehicle, such as an internal combustion engine vehicle (ICEV), a hybrid electric vehicle (HEV), an electric vehicle (EV), or a battery electric vehicle (BEV) to perform four-wheel driving.

BACKGROUND ART

In general, a disconnector apparatus refers to an apparatus mounted in a differential assembly and capable of minimizing an unnecessary loss of power by switching between two-wheel driving (2WD) and four-wheel driving (4WD) by engaging or disengaging a differential shaft depending on a traveling situation.

In the case of most of the disconnector apparatuses in the related art, a control system such as a hydraulic motor or a pneumatic motor is used to move a sleeve to cut off power of an input part such as a motor or an engine or an output part such as a vehicle wheel, thereby switching the driving mode from the four-wheel driving (4WD) to the two-wheel driving (2WD).

FIG. 1 is a view illustrating a disconnector apparatus in the related art. Referring to FIG. 1, a disconnector apparatus 200 in the related art is connected to a differential assembly 100. A differential gear set is mounted in a differential casing 101 of the differential assembly 100. The differential gear set includes two first and second side gears 111 and 112 and two pinion gears 121 and 122 engaging with the first and second side gears 111 and 112.

The disconnector apparatus 200 in the related art includes: a differential shaft 210 provided in the differential casing 101 and connected to the first side gear 111 positioned at the right side in FIG. 2; a hub 220 connected to a right vehicle wheel; a ball screw shaft 240 connected to a motor 230 and configured to be rotated by an operation of the motor 230; a nut 250 configured to move along the ball screw shaft 240 when the ball screw shaft 240 operates in a state in which the nut 250 is coupled to the ball screw shaft 240; and a fork 280 configured to be movable along a guide rail 260 by an operation of the nut 250 and move a sleeve 270 to connect or disconnect the differential shaft 210 and the hub 220.

In the disconnector apparatus 200 in the related art, the ball screw shaft 240 is rotated by the operation of the motor 230 including a position sensor. The rotation of the ball screw shaft 240 moves the fork 280 together with the nut 250 that moves along the ball screw shaft 240. When the fork 280 moves, the sleeve 270 connected to the fork 280 moves, such that the differential shaft 210 and the hub 220 engage with each other to connect the power. The power is cut off as the differential shaft 210 and the hub 220 disengage from each other. Specifically, when the ball screw shaft 240 is rotated in one direction by the operation of the motor 230, the sleeve 270 moves toward the differential shaft 210, and the differential shaft 210 and the hub 220 engage with each other, such that the power is transmitted to the right vehicle wheel. On the contrary, when the ball screw shaft 240 is rotated in the other direction by the operation of the motor 230, the sleeve 270 moves toward the hub 220, and the differential shaft 210 and the hub 220 disengage from each other.

However, in the case of the disconnector apparatus in the related art, the structure for connecting the differential shaft and the hub, which are separated from the motor, through the ball screw shaft, the fork, and the sleeve, is complicated, which excessively increases an overall length, increases an assembly space and a weight, and makes vehicle mountability disadvantageous. Further, electric power consumption (20 A) required to operate the motor is excessively high, and a stroke of a BLDC motor needs to be precisely controlled, which complicates the operation of the control system and increases manufacturing costs. In case of two-wheel driving of a four-wheel drive vehicle having disconnected auxiliary driving wheels, a final reduction gear is stopped when a rotation of an input part is stopped. When the vehicle travels straight at a high speed in the state in which the differential shaft and the hub are disconnected, there is a fatal problem in that a high differential motion of the pinion gear, which rotates at a high speed in conjunction with the rotation of the left side gear, causes noise and vibration.

In contrast, the present invention provides a disconnector apparatus including: a differential casing configured to transmit input torque; a differential gear set configured to perform a differential motion; a support ring configured to support a pinion gear of a differential gear set; a clutch ring configured to be coupled to or decoupled from the support ring; an elastic member configured to elastically support the clutch ring; and an actuator including an armature connected to the clutch ring by means of an application rod and configured to perform disconnecting by operating in a non-contact manner with a magnetic coil. Therefore, the non-contact operation is advantageous in durability and noise performance, simplifies the structure, and implements excellent mountability.

DOCUMENT OF RELATED ART

Patent Document (Patent Document 1) Korean Patent Application Laid-Open No. 10-2017-0123869 (published on Nov. 9, 2017)

SUMMARY OF THE INVENTION

The present invention has been made in an effort to provide a disconnector apparatus in which an armature connected to an application rod connected directly to a clutch ring cooperates with a magnetic coil in a non-contact manner, such that the clutch ring and the support ring may be coupled or decoupled by disconnecting.

An exemplary embodiment of the present invention provides a disconnector apparatus including: a support ring provided in a differential casing and configured to support a pinion gear mounted therein; a clutch ring configured to be coupled to or decoupled from the support ring in the differential casing; an actuator including an armature provided at an outer side of the differential casing opposite to the clutch ring, the actuator being configured to couple the clutch ring and the support ring by pulling, with an electromagnetic force, the armature connected to the clutch ring by means of an application rod; and an elastic member coupled to a portion of the application rod in the differential casing and having one end in contact with the differential casing and the other end in contact with the clutch ring to elastically support the clutch ring.

The actuator may include: a core disposed to face the armature; and a magnetic coil configured to pull the armature by generating the electromagnetic force when the power is applied in the state in which the magnetic coil is accommodated in the core.

The core and the magnetic coil may each have a non-contact structure with the armature.

The magnetic coil and the core may be fixed to a transmission housing and independent of a rotation of the differential casing.

In addition, a bushing may be coupled to an extension portion extending from one side of the differential casing in a direction toward the actuator, and a central portion of the armature and a central portion of the core may be coupled to the bushing.

The bushing may be made of a non-magnetic material.

Dog portions, which are capable of being coupled or decoupled, may be provided on a surface of the clutch ring and a surface of the support ring that face each other.

An outer diameter of the clutch ring and an inner diameter of the differential casing may be connected by means of a spline structure.

The application rod may have one end connected to the clutch ring and the other end connected to the armature by penetrating the differential casing.

The armature may be made of a magnetic material.

A central shaft may be provided in the support ring, pinion gears may be rotatably coupled at two opposite sides of the central shaft, and side gears engaging with the two pinion gears may be provided at two opposite sides with the two pinion gears therebetween.

A cover may be detachably provided at a lateral end of the differential casing, and a driving gear may be mounted on the cover.

According to the present invention, the armature connected to the application rod connected directly to the clutch ring cooperates with the magnetic coil in a non-contact manner, such that the clutch ring and the support ring may be coupled or decoupled by disconnecting.

According to the present invention, in the case of the auxiliary wheels that coast when the vehicle travels in the two-wheel driving (2WD) mode as the disconnector apparatus is decoupled, the support ring for supporting the pinion gear also rotates, which makes it possible to prevent the high differential motion.

Since the present invention uses the magnetic coil, the current consumption is low in comparison.

According to the present invention, the armature performs the non-contact rotational motion, which makes it possible to implement the structure advantageous in wear resistance and noise performance and having an area in which a large number of electromagnetic actions are performed between the armature and the magnetic coil and make the operating force and responsiveness excellent.

According to the present invention, an expensive actuator such as a BLDC motor, a ball screw shaft, or a fork requiring high current consumption in the related art may be substituted with the magnetic coil, which is low-priced and requires low current consumption, and the thrust bearing may be eliminated, which makes it possible to reduce costs.

According to the present invention, since the differential assembly and the disconnector apparatus are integrated, it is possible to significantly reduce the overall length and considerably reduce the weight and improve packaging mountability.

According to the present invention, large-sized components such as a hub and a sleeve may be eliminated, bearings for supporting the large-sized components may be eliminated, and the armature and the magnetic coil are not in contact with each other, which makes it possible to eliminate the thrust bearing and thus reduce the number of components.

According to the present invention, the differential assembly and the disconnector apparatus are integrated, which makes it possible to simplify the assembly process.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
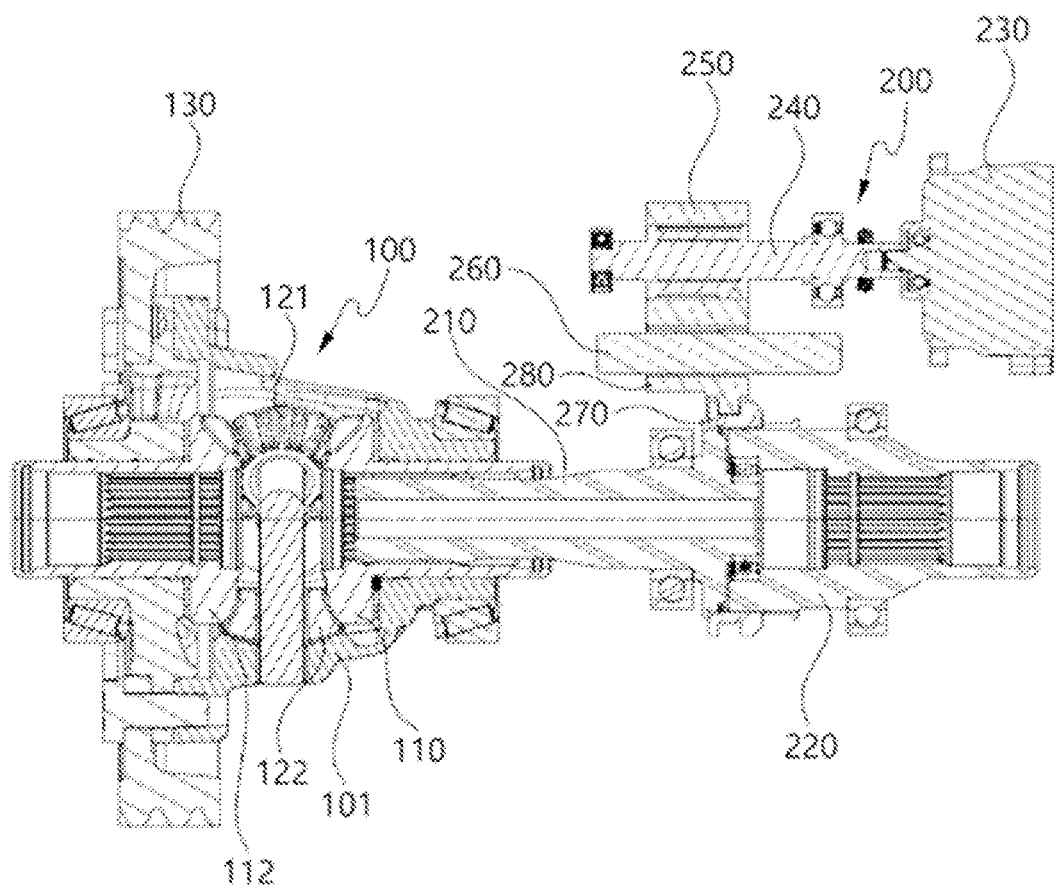
FIG. 1 is a view illustrating a disconnector apparatus in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

In a case in which front wheels or rear wheels of a four-wheel driving (4WD) vehicle are main driving wheels and the other wheels (the rear wheels or the front wheels) are auxiliary wheels, a disconnector apparatus according to the present invention is an apparatus for interrupting power transmission to improve fuel economy (efficiency) by inhibiting rotational resistance (drag) of an auxiliary wheel speed reducer when the vehicle coasts and preventing a counter electromotive force of a motor when the vehicle travels using only power of the main driving wheels.

Figure 2:
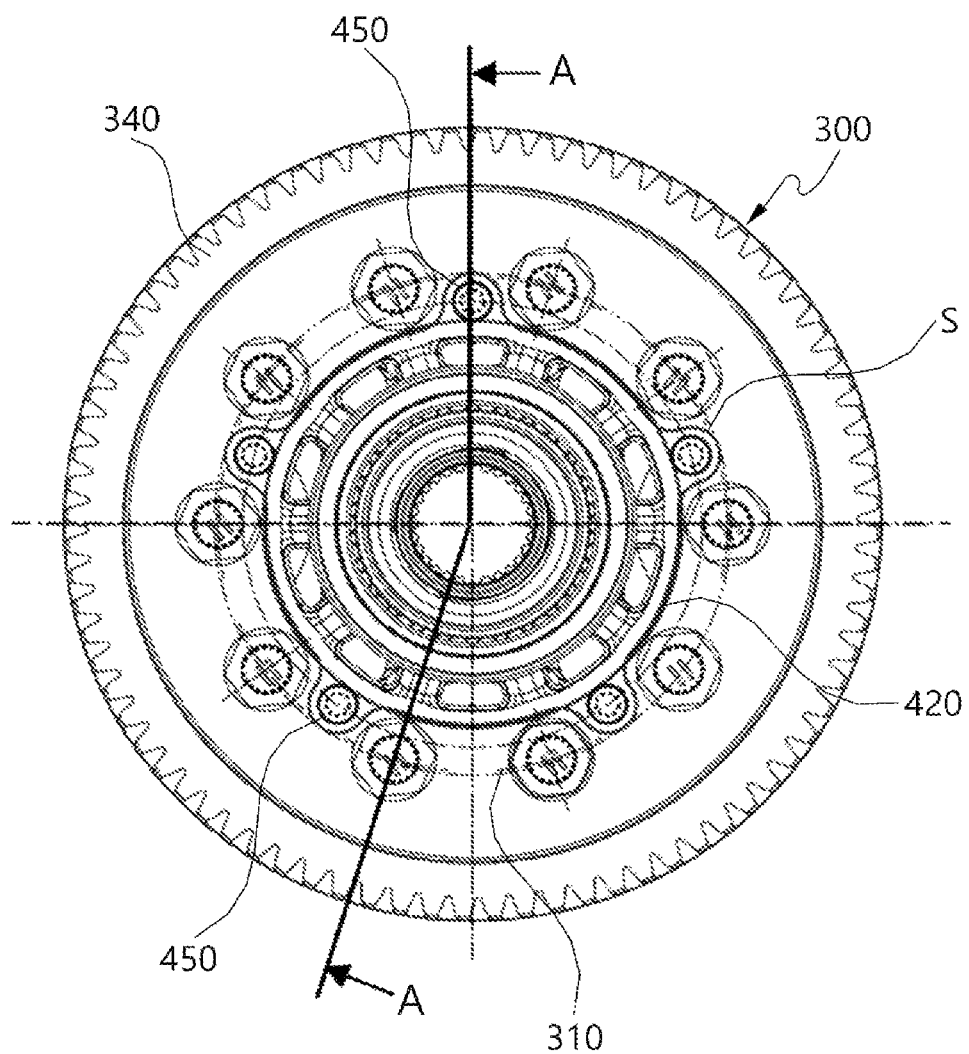
FIG. 2 is a side view illustrating a disconnector apparatus according to an exemplary embodiment of the present invention.
Figure 3:
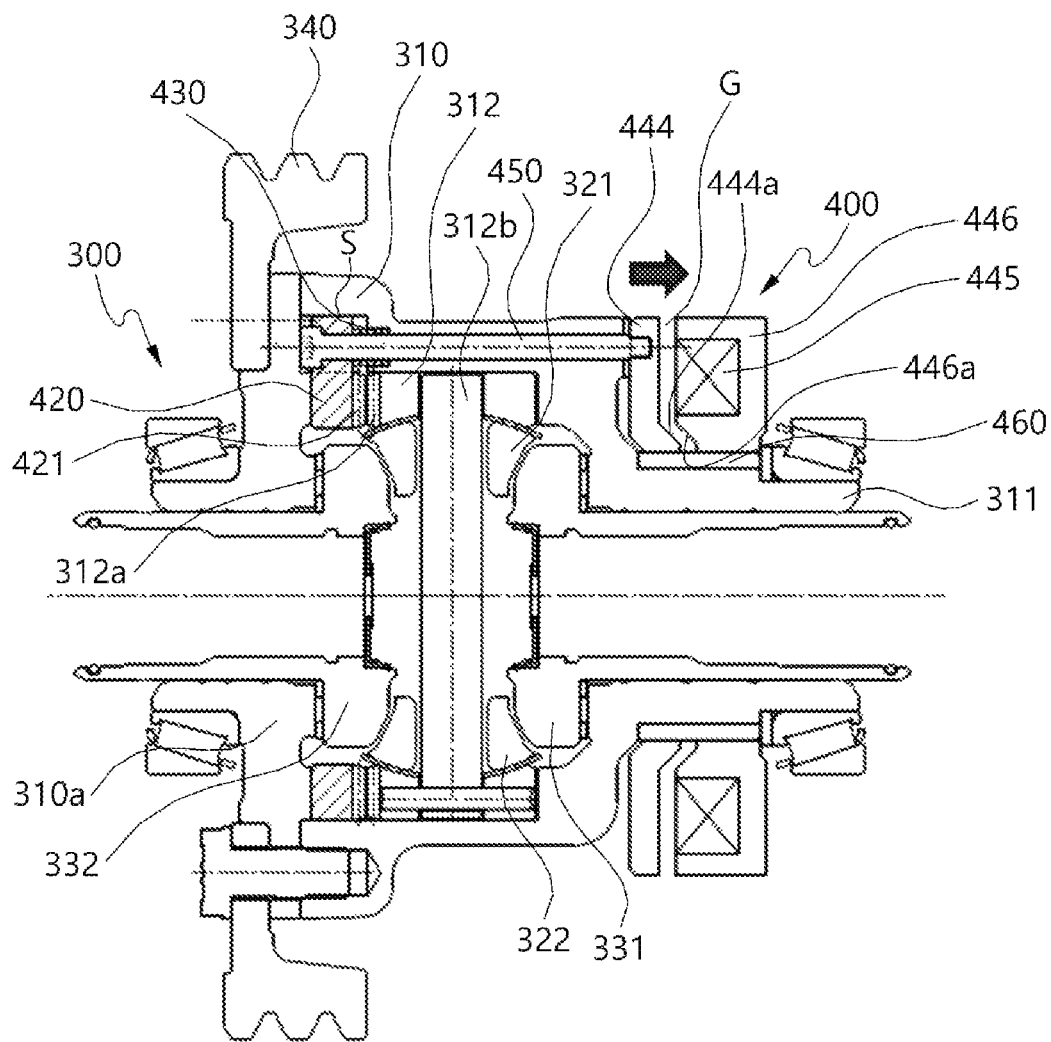
FIG. 3 is a cross-sectional view taken along line A-A in FIG. 2.
Figure 4:
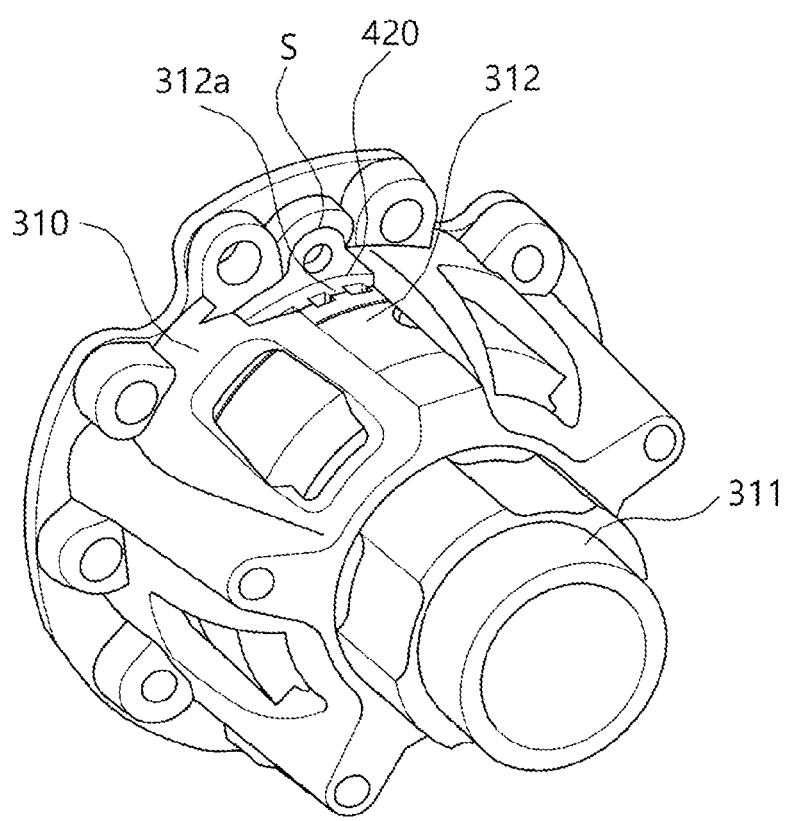
FIG. 4 is a view illustrating a state in which a clutch ring and a support ring are assembled in a differential casing according to the exemplary embodiment of the present invention.
Figure 5:
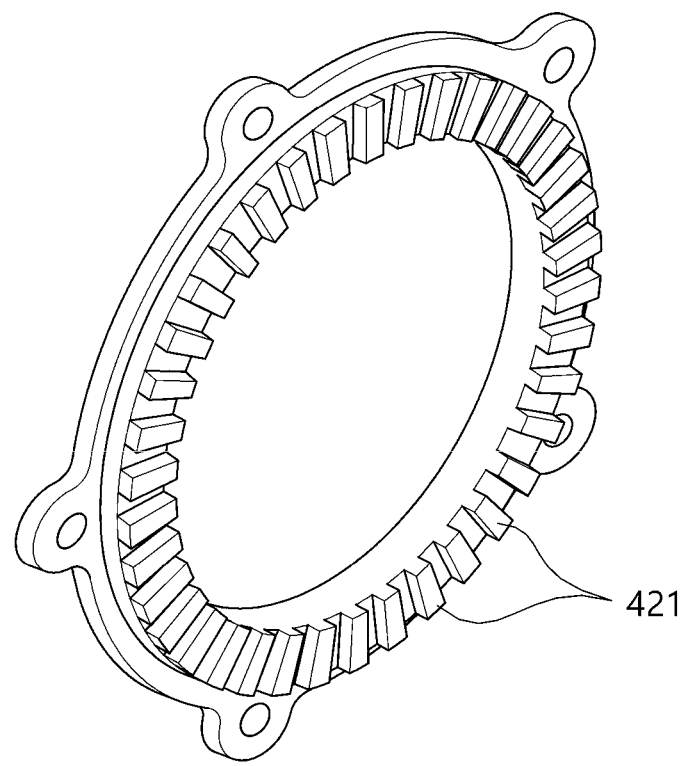
FIG. 5 is an enlarged view of the clutch ring according to the exemplary embodiment of the present invention.

FIG. 2 is a side view illustrating a disconnector apparatus according to an exemplary embodiment of the present invention, FIG. 3 is a cross-sectional view taken along line A-A in FIG. 2, FIG. 4 is a view illustrating a state in which a clutch ring and a support ring are assembled in a differential casing according to the exemplary embodiment of the present invention, and FIG. 5 is an enlarged view of the clutch ring according to the exemplary embodiment of the present invention.

As illustrated in FIGS. 2 to 5, a disconnector apparatus 400 according to the present invention is coupled to a differential assembly 300. The disconnector apparatus 400 according to the present invention includes: a support ring 312 configured to support first and second pinion gears 321 and 322; a clutch ring 420 configured to be coupled to or decoupled from the support ring 312; an actuator configured to use an electromagnetic force to pull an armature 444 connected to the clutch ring 420 by means of an application rod 450 to couple the clutch ring 420 and the support ring 312, and an elastic member 430 configured to elastically support the clutch ring 420.

Specifically, a differential casing 310, which constitutes the differential assembly 300, includes an extension portion 311. The extension portion 311 extends in one direction toward the actuator from one side of the differential casing 310. The differential casing 310 may have a separable structure. For example, a cover 310a may be disposed at a lateral end of the differential casing 310, which is directed toward a driving gear 340, and the cover 310a may be attached or detached by a coupling member such as a bolt. The driving gear 340 may be mounted outside the cover 310a. The cover 310a may support a second side gear 332.

The differential gear set is provided in the differential casing 310 and includes first and second side gears 331 and 332 and first and second pinion gears 321 and 322. For example, the first side gear 331 may be positioned at the right side in FIG. 2. For example, the second side gear 332 may be positioned at the left side in FIG. 2.

Gear teeth are provided at one end of the first side gear 331 directed toward the second side gear 332. The other end of the first side gear 331 may be partially exposed to the outside through the inside of the extension portion 311. The first and second side gears 331 and 332, which are disposed at two opposite sides, may be connected to auxiliary wheels (not illustrated) at two left and right opposite sides through a driving shaft (not illustrated).

The support ring 312 is provided in the differential casing 310. The support ring 312 is disposed in the differential casing 310 and supports the first and second pinion gears 321 and 322. For example, the support ring 312 is structured to be separated from the differential casing 310 so as to operate in the differential casing 310. A central shaft 312b is provided in the support ring 312. The first and second pinion gears 321 and 322 are rotatably coupled to two opposite sides of the central shaft 312b. The first and second pinion gears 321 and 322 are positioned between the first and second side gears 331 and 332.

The clutch ring 420 is provided in the differential casing 310. The clutch ring 420 may be coupled to or decoupled from the support ring 312. The clutch ring 420 is positioned adjacent to the second side gear 332.

An outer diameter portion of the clutch ring 420 may be connected to an inner diameter portion of the differential casing 310, which corresponds to the outer diameter portion of the clutch ring 420, may be connected by means of a spline structure S. When the actuator operates, the clutch ring 420 may move in the direction toward the support ring 312 in the state in which the clutch ring 420 is connected to the differential casing 310 by means of the spline structure S.

The clutch ring 420 includes a first dog portion 421. The first dog portion 421 is provided at a lateral surface of the clutch ring 420 directed toward the support ring 312. A second dog portion 312a is provided on a lateral surface of the support ring 312. The first dog portion 421 of the clutch ring 420 is correspondingly coupled to the second dog portion 312a of the support ring 312.

For example, other dog portions may be further provided on the clutch ring 420 in addition to the first dog portion 421 and coupled to the dog portion provided on the differential casing 310.

The elastic member 430 is positioned in the differential casing 310. For example, the elastic member 430 may be a return spring. The elastic member 430 is coupled to a portion of the application rod 450 in the differential casing 310. The elastic member 430 has one end in contact with the differential casing 310 and the other end in contact with the clutch ring 420.

The actuator includes the armature 444, a core 446 disposed to face the armature 444, and a magnetic coil 445 disposed in the core 446.

The extension portion 311 has an outer diameter smaller than an outer diameter of the differential casing 310. A bushing 460 may be mounted on the extension portion 311 of the differential casing 310. The bushing 460 is mounted at a central portion of the armature 444 and the core 446. The bushing 460 may center the magnetic coil 445 and the armature 444. The bushing 460 serves as a guide for guiding a movement of the armature 444 in an axial direction.

For example, the bushing 460 may be made of a non-magnetic material. Since the bushing 460 is made of a non-magnetic material, it is possible to prevent a leak of electromagnetic force generated when applying electricity to the magnetic coil 445.

The core 446 and the magnetic coil 445 may be fixed to the transmission housing (not illustrated). The core 446 and the magnetic coil 445 may be structured to be independent of the rotation of the differential casing 310. Specifically, when the differential casing 310 rotates in the state in which the dog portion of the clutch ring 420 and the dog portion of the support ring 312 are coupled, the clutch ring 420, the support ring 312, and the armature 444 also rotate together with the differential casing 310, but the magnetic coil 445 and the core 446 are fixed in a speed reducer housing (not illustrated) and do not rotate. For example, the disconnector apparatus 400 may be embedded in the transmission housing (not illustrated).

The core 446 and the magnetic coil 445 each have a non-contact structure that is not in contact with the armature 444 and have an air gap G of a predetermined distance from the armature 444.

The surface of the core 446 and the surface of the armature 444, which face each other, may be at least partially configured as inclined surfaces 444a and 446a. With this structure, it is possible to provide assembly convenience by avoiding interference with other components when assembling the core 446 and the armature 444.

For example, the armature 444 may be made of a ferromagnetic material. Since the armature 444 is made of a ferromagnetic material, the armature 444 may be easily pulled by the electromagnetic force generated when power is applied to the magnetic coil 445.

The armature 444 is provided at an outer side of the differential casing 310 opposite to the clutch ring 420. The application rod 450 has one end connected to the clutch ring 420 and the other end connected to the armature 444 by penetrating the differential casing 310. For example, an assembly member such as a bushing is coupled to a portion of the differential casing 310 to which the application rod 450 is coupled, and then the application rod 450 is coupled in the assembly member, such that the armature 444 coupled to the application rod 450 may be accurately assembled at the exact position.

The clutch ring 420 may stably move along the application rod 450 in the state in which the clutch ring 420 is elastically supported by the elastic member 430.

An operation of the disconnector apparatus according to the present invention during the two-wheel driving will be described.

As illustrated in FIGS. 2 and 3, in an initial state before power is applied to the magnetic coil 445 during the two-wheel driving (2WD), the clutch ring 420 is positioned in a direction in which the dog portion is decoupled by being pushed by an elastic force of the elastic member 430. Therefore, the disconnector apparatus may operate by a normal open type in the two-wheel driving (2WD) mode. Specifically, in the two-wheel driving (2WD) state, the clutch ring 420 is positioned in the direction in which the dog portion is decoupled by being pushed by the elastic force of the elastic member 430. Therefore, the first dog portion 421 of the clutch ring 420 and the second dog portion 312a of the support ring 312 disengage. In this state, an operation of a power source such as a motor (not illustrated) of a speed reducer is stopped, and thus power from the power source is not transmitted to the driving gear 340.

When the two auxiliary wheels (not illustrated) coast in this state, the rotational force of the two auxiliary wheels is transmitted to the two first and second side gears 331 and 332 through the driving shaft (not illustrated), such that the first and second side gears 331 and 332 rotate.

Since the first and second side gears 331 and 332 engage with the first and second pinion gears 321 and 322, the support ring 312 also rotates together with the first and second side gears 331 and 332 as the first and second side gears 331 and 332 rotate.

In this case, since the support ring 312 is separated from the differential casing 310, only the support ring 312 rotates, but the differential casing 310 does not rotate. Therefore, the two-wheel driving may be performed such that the auxiliary wheels coast and only the main driving wheels travel.

As described above, when the two auxiliary wheels (not illustrated) coast, the rotational force of the two auxiliary wheels is transmitted only to the support ring 312 through the first and second side gears 331 and 332 and the first and second pinion gears 321 and 322. Therefore, the support ring 312 rotates in the differential casing 310 in the state in which the differential casing 310 does not rotate, which makes it possible to prevent a high differential motion.

Next, an operation of the disconnector apparatus according to the present invention during the four-wheel driving will be described.

As illustrated in FIGS. 2 and 3, power is applied to the magnetic coil 445 during the four-wheel driving (4WD). An electromagnetic field is generated as the power is applied to the magnetic coil 445.

As the electromagnetic field is generated, the armature 444 made of a ferromagnetic material moves in the direction toward the magnetic coil 445. The armature 444 is pulled by a required stroke in the direction toward the magnetic coil 445 by the electromagnetic force.

The non-contact, normal open type operation may be implemented by adding the application rod 450 to connect the magnetic coil 445 and the clutch ring 420 positioned at opposite positions.

The clutch ring 420 is connected and assembled by the application rod 450 and the armature 444 that operates in conjunction with the operation of the magnetic coil 445. In the initial state, the clutch ring 420 is positioned by the elastic member 430 in the direction in which the dog portion is decoupled. When the power is applied to the magnetic coil 445, the clutch ring 420 may rotate by being synchronized with the differential casing 310.

Specifically, when the armature 444 is pulled toward the magnetic coil 445, the clutch ring 420 connected to the armature 444 by means of the application rod 450 is also pulled, such that the dog portion of the clutch ring 420 and the dog portion of the support ring 312 are coupled.

As the clutch ring 420 moves along the application rod 450, the first dog portion 421 is correspondingly coupled to the second dog portion 312a of the support ring 312. Therefore, the vehicle may operate in the four-wheel driving (4WD) mode.

During the four-wheel driving (4WD), the power of the power source such as the motor of the speed reducer is transmitted to the driving gear 340. Since the dog portions of the clutch ring 420 and the support ring 312 are coupled, the power of the power source is transmitted to the differential casing 310 through the driving gear 340, such that the differential casing 310 rotates. The driving gear 340 may be connected to the differential casing 310 by a coupling member such as a bolt and transmit the power of the power source to the differential casing 310.

As the differential casing 310 rotates, the support ring 312 rotates in the differential casing 310. During the four-wheel driving (4WD), the dog portion of the clutch ring 420 and the dog portion of the support ring 312 are coupled, and the clutch ring 420 is connected to the differential casing 310 by means of the spline structure S. Therefore, the power of the power source may be transmitted to the support ring 312 through the driving gear 340, the differential casing 310, and the clutch ring 420.

As the support ring 312 rotates, the power is transmitted to the first and second side gears 331 and 332 engaging with the first and second pinion gears 321 and 322, such that the first and second side gears 331 and 332 rotate.

As the first and second side gears 331 and 332 rotate, the power is transmitted to the two auxiliary wheels through the driving shaft (not illustrated) connected to the first and second side gears 331 and 332 at two opposite sides, such that the two auxiliary wheels may rotate. Therefore, the four-wheel driving may be performed as the power of the power source is transmitted to the auxiliary wheels as well as the main driving wheels.

Meanwhile, when the application of power to the magnetic coil 445 is cut off, the armature 444 and the clutch ring 420 may be returned to the original positions by the elastic force of the elastic member 430.

Specifically, when the application of power to the magnetic coil 445 is cut off, the electromagnetic force disappears, the armature 444 is distant from the magnetic coil 445 like the initial state, and the force of the clutch ring 420, which presses the elastic member 430 in conjunction with the operation of the armature 444, disappears, such that the compressed elastic member 430 is extended.

As the elastic member 430 is extended, the clutch ring 420 and the support ring 312 are decoupled. That is, the first dog portion 421 of the clutch ring 420, which is coupled to the second dog portion 312a of the support ring 312, is decoupled by being separated from the second dog portion 312a.

As the clutch ring 420 returns to the original state, the armature 444 connected to the clutch ring 420 by means of the application rod 450 also returns to the original state together with the clutch ring 420.

Since the armature 444 and the clutch ring 420 are returned to the original positions by the elastic member 430 when the application of power to the magnetic coil 445 is cut off as described above, the vehicle may operate in the two-wheel driving (2WD) mode.

A disconnector apparatus in the related art requires precise control of an operation mechanism of a dog portion. According to the present invention, since the first dog portion of the clutch ring is formed to have a flat surface, the first dog portion and the second dog portion of the support ring may quickly come into contact with each other with appropriate responsiveness when the first dog portion and the second dog portion are coupled. Further, the first dog portion and the second dog portion are coupled by an appropriate force. Therefore, precise control is not required, and a simple control system may be implemented.

According to the present invention, a sensor capable of measuring a displacement may be required to be mounted to prevent the separation of the clutch ring and the support ring during the process of correcting and operating the magnetic force in accordance with the stroke of the armature. To this end, although not specifically illustrated in the drawings, a stroke sensor for measuring a displacement and checking whether the clutch ring and the support ring are appropriately coupled may be provided. The stroke sensor may be an on/off sensor that detects only on/off positions in a fail-safe manner.

According to the present invention described above, the armature connected to the application rod connected directly to the clutch ring cooperates with the magnetic coil in a non-contact manner, such that the clutch ring and the support ring may be coupled by disconnecting. In addition, according to the present invention, in the case of the auxiliary wheels that coast when the vehicle travels in the two-wheel driving (2WD) mode as the disconnector apparatus is decoupled, the support ring for supporting the pinion gear also rotates, which makes it possible to prevent the high differential motion. In addition, since the present invention uses the magnetic coil, the current consumption is significantly low in comparison with the motor. In addition, according to the present invention, the armature performs the non-contact rotational motion, which makes it possible to implement the structure advantageous in wear resistance and noise performance and having an area in which a large number of electromagnetic actions are performed between the armature and the magnetic coil and make the operating force and responsiveness excellent. In addition, according to the present invention, an expensive actuator such as a BLDC motor, a ball screw shaft, or a fork requiring high current consumption in the related art may be substituted with the magnetic coil, which is low-priced and requires low current consumption, and the thrust bearing may be eliminated, which makes it possible to reduce costs. In addition, according to the present invention, since the differential assembly and the disconnector apparatus are integrated, it is possible to significantly reduce the overall length and considerably reduce the weight and improve packaging mountability. In addition, according to the present invention, large-sized components such as a hub and a sleeve may be eliminated, bearings for supporting the large-sized components may be eliminated, and the armature and the magnetic coil are not in contact with each other, which makes it possible to eliminate the thrust bearing and thus reduce the number of components. In addition, according to the present invention, the differential assembly and the disconnector apparatus are integrated, which makes it possible to simplify the assembly process.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A disconnector apparatus comprising:
a support ring provided in a differential casing and configured to support two pinion gears mounted therein;
a clutch ring configured to be coupled to or decoupled from the support ring in the differential casing;
an actuator comprising an armature provided at an outer side of the differential casing opposite to the clutch ring, the actuator being configured to couple the clutch ring and the support ring by pulling, with an electromagnetic force, the armature connected to the clutch ring by an application rod; and an elastic member coupled to a portion of the application rod in the differential casing and having one end in contact with the differential casing and the other end in contact with the clutch ring to elastically support the clutch ring, wherein the actuator comprises:

a core having an inclined surface disposed to face the armature having an inclined surface, wherein the inclined surface of the core faces the inclined surface of the armature, and wherein a central portion of the armature and a central portion of the core are coupled to a bushing; and a magnetic coil configured to pull the armature by generating the electromagnetic force when the power is applied in the state in which the magnetic coil is accommodated in the core.

2. The disconnector apparatus of claim 1, wherein the core and the magnetic coil each have a non-contact structure with the armature.

3. The disconnector apparatus of claim 1, wherein the magnetic coil and the core is fixed to a transmission housing and independent of a rotation of the differential casing.

4. The disconnector apparatus of claim 1, wherein the bushing is coupled to an extension portion extending from one side of the differential casing in a direction toward the actuator.

5. The disconnector apparatus of claim 4, wherein the bushing is made of a non-magnetic material.

6. The disconnector apparatus of claim 1, wherein dog portions, which are capable of being coupled or decoupled, are provided on a surface of the clutch ring and a surface of the support ring that face each other.

7. The disconnector apparatus of claim 1, wherein an outer diameter of the clutch ring and an inner diameter of the differential casing are connected by a spline structure.

8. The disconnector apparatus of claim 1, wherein the application rod has one end connected to the clutch ring and the other end connected to the armature by penetrating the differential casing.

9. The disconnector apparatus of claim 1, wherein the armature is made of a magnetic material.

10. The disconnector apparatus of claim 1, wherein a central shaft is provided in the support ring, the two pinion gears are rotatably coupled at two opposite sides of the central shaft, and two side gears engaging with the two pinion gears are provided at two opposite sides of the two pinion gears.

11. The disconnector apparatus of claim 1, wherein a cover is detachably provided at a lateral end of the differential casing, and a driving gear is mounted on the cover.

* * * * *